US008666261B2

(12) United States Patent
Takahashi

(10) Patent No.: US 8,666,261 B2
(45) Date of Patent: Mar. 4, 2014

(54) PHOTOELECTRIC ENCODER

(75) Inventor: Tomotaka Takahashi, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 524 days.

(21) Appl. No.: 13/050,438

(22) Filed: Mar. 17, 2011

(65) Prior Publication Data

US 2011/0229151 A1 Sep. 22, 2011

(30) Foreign Application Priority Data

Mar. 18, 2010 (JP) ................................. 2010-062746

(51) Int. Cl.
*H04B 10/04* (2011.01)
*G01D 5/34* (2006.01)

(52) U.S. Cl.
USPC ........... 398/183; 398/192; 398/200; 398/201; 250/231.16; 356/616

(58) Field of Classification Search
USPC ........ 398/182–201; 250/231.13–231.17, 230; 356/614–624
See application file for complete search history.

(56) References Cited

U.S. PATENT DOCUMENTS

| 4,620,094 | A | * | 10/1986 | Tani et al. ................. 250/231.16 |
| 5,428,445 | A | | 6/1995 | Holzapfel |
| 5,646,730 | A | | 7/1997 | Mitchell et al. |
| 5,671,052 | A | * | 9/1997 | Kawakubo et al. ........... 356/616 |
| 8,173,951 | B2 | * | 5/2012 | Takahashi ................ 250/231.16 |
| 2003/0047674 | A1 | | 3/2003 | Thornburn et al. |
| 2004/0007664 | A1 | * | 1/2004 | Mitchell .................... 250/237 G |
| 2006/0180748 | A1 | | 8/2006 | Schoser et al. |
| 2007/0018084 | A1 | * | 1/2007 | Shimomura et al. ..... 250/231.13 |
| 2009/0135435 | A1 | * | 5/2009 | Zwilling et al. ............... 356/616 |
| 2010/0057392 | A1 | * | 3/2010 | York ............................. 702/94 |

FOREIGN PATENT DOCUMENTS

JP 2008-503745 2/2008

* cited by examiner

*Primary Examiner* — Li Liu
(74) *Attorney, Agent, or Firm* — Rankin, Hill & Clark LLP

(57) ABSTRACT

A photoelectric encoder includes a scale; a detector; alight application section; a pair of origin signal reception sections; and a signal processing section adapted to provide the maximum value of the signal level output from the origin signal reception sections by side lobe light occurring as reflected on the origin mark as a stipulated value, provide an effective area of origin detection between the first position at which output of one of the origin signal reception sections for outputting a larger signal level than the stipulated value earlier than the relative displacement becomes a larger signal level than the stipulated value and the first position at which output of the other origin signal reception section exceeds the stipulated value and then becomes a smaller signal level than the stipulated value, and configured to generate the origin detection signal in the effective area.

8 Claims, 10 Drawing Sheets

DIFFRACTION AREA ON SCALE
(LENGTH MEASUREMENT POINT)

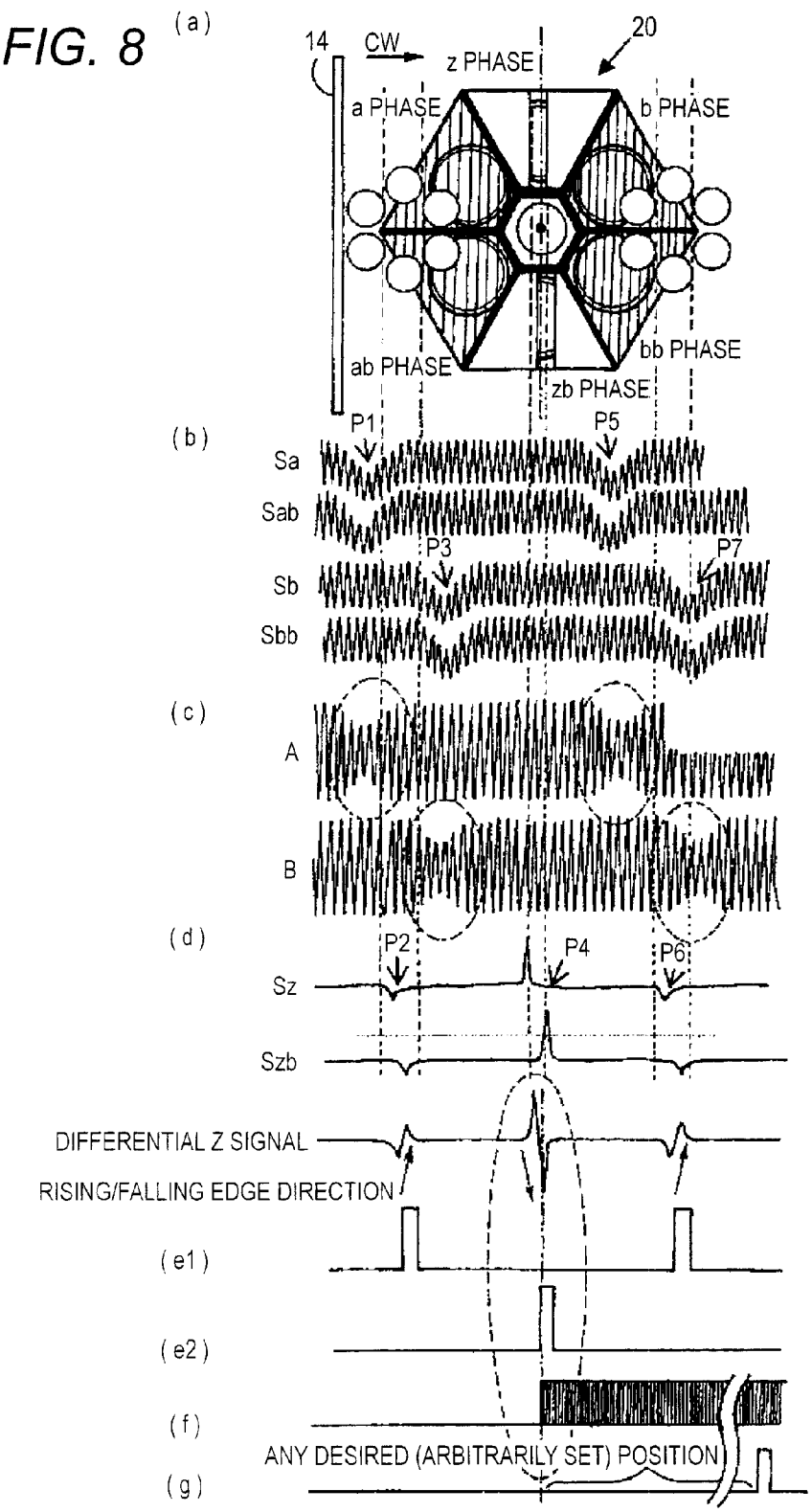

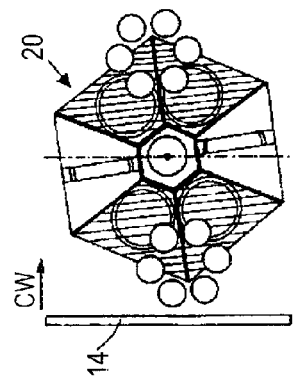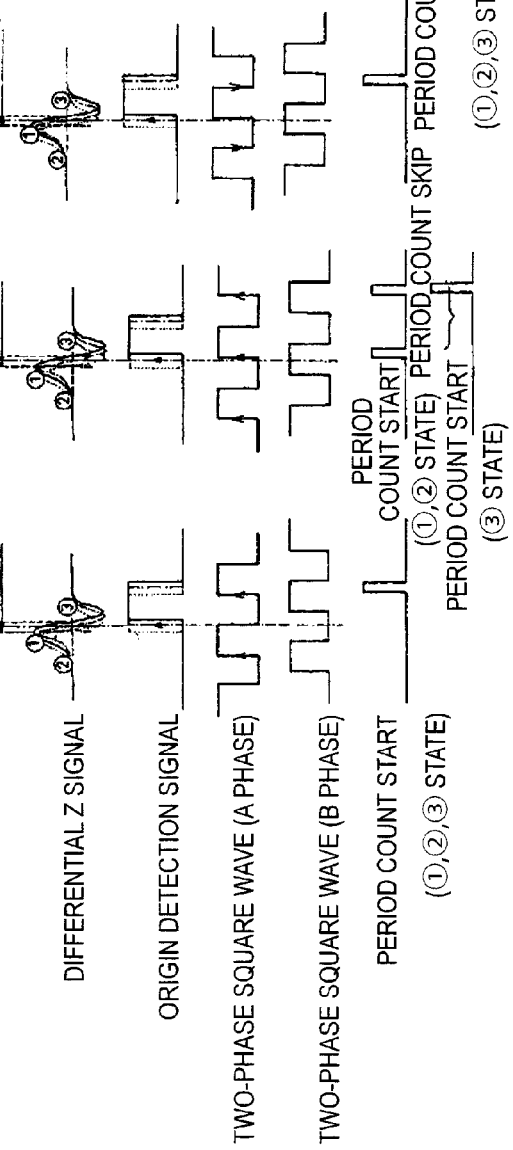

PHOTOELECTRIC ENCODER

CROSS-REFERENCE TO RELATED APPLICATION(S)

This application is based upon and claims the benefit of priority from Japanese Patent Application No. 2010-062746, filed on Mar. 18, 2010, the entire contents of which are incorporated herein by reference.

BACKGROUND

1. Field of the Invention

This invention relates to a photoelectric encoder including a scale having an incremental track formed with reflection gratings at equal intervals along a length measurement direction and a detector which displaces relative to the scale and in particular to a photoelectric encoder which circumvents erroneous detection of an origin because of diffraction of light in an origin mark and can accurately detect an origin.

2. Description of the Related Art

For example, a configuration as shown in International Patent Publication No. 2008-503745 is proposed to provide a small detector configuration and an origin detection function in a photoelectric encoder including a scale having an incremental track formed with reflection gratings at equal intervals along a length measurement direction and a detector which displaces relative to the scale. In the configuration, an origin mark is put on the incremental track of the scale. Thus, in International Patent Publication No. 2008-503745, an image of light applied to the origin mark is formed on a sensor divided into two by image forming means of a lens, etc., and one output of the sensor is subtracted from the other output of the sensor. A zero cross position is found in the subtraction signal (differential signal), whereby an origin is detected in International Patent Publication No. 2008-503745.

However, in International Patent Publication No. 2008-503745, the detector is provided with at least the image forming means and thus it is feared that the detection may be complicated.

In the placement concerning origin detection in International Patent Publication No. 2008-503745, for example, it is also considered that light is reflected on the origin mark and the reflected light is made incident directly on the sensor without using the image forming means. However, the origin mark is considerably small and thus when light is applied to the origin mark, light is diffracted. Thus, the diffracted light caused by the origin mark is incident on the sensor and when the differential signal is obtained, more than one zero cross position occurs and it is feared that the origin may be erroneously detected.

SUMMARY

The invention is embodied to solve the problem and it is an object of the invention to make it possible to circumvent erroneous detection of an origin because of diffraction of light in an origin mark and execute precise origin detection without complicating a detector.

According to one aspect of the invention, there is provided a photoelectric encoder including: a scale having an incremental track formed with reflection gratings at equal intervals along a length measurement direction; a detector which displaces relative to the scale; a reflection origin mark formed in at least one place of the incremental track, provided on the scale; a light application section provided in the detector for applying light to the incremental track; a pair of origin signal reception sections provided in the detector and placed symmetrically with respect to the light application section in the length measurement direction; and a signal processing section having an origin signal processing section configured to find a differential signal of output from the pair of origin signal reception sections by light reflected on the origin mark, configured to generate an origin detection signal corresponding to a position of the origin mark, and configured to output an origin signal, wherein the origin signal processing section is adapted to provide the maximum value of the signal level output from the origin signal reception sections by side lobe light occurring as reflected on the origin mark as a stipulated value, provide an effective area of origin detection between the first position at which output of one of the origin signal reception sections for outputting a larger signal level than the stipulated value earlier than the relative displacement becomes a larger signal level than the stipulated value and the first position at which output of the other origin signal reception section exceeds the stipulated value and then becomes a smaller signal level than the stipulated value, and generate the origin detection signal in the effective area.

The effective area may be a range in which the output of the other origin signal reception section becomes larger than the signal level of the differential signal.

In the photoelectric encoder, the signal processing section may include an internal period counter which is reset by the origin detection signal and counts the number of periods according to the reflection gratings occurring because of the relative displacement; a memory/set circuit, provided in the origin signal processing section, configured to store the position of the origin signal relative to the occurrence position of the origin detection signal as the position of the origin signal is specified from the outside; and an output circuit, provided in the origin signal processing section, configured to output the origin signal in a state in which the count position output from the internal period counter is the position specified in the memory/set circuit.

In the photoelectric encoder, the detector may include main light reception sections configured to receive an interference fringe formed as light applied from the light application section is diffracted in the reflection gratings of the scale through four light reception windows placed in the surrounding of the light application section with the position of the light application section as the center and having relationship of 90-degree phase difference placed along the length measurement direction and 180-degree phase difference placed along the perpendicular direction to the length measurement direction and configured to output four incremental signals different in phase.

The pair of origin signal light reception sections may be placed in the perpendicular direction to the length measurement section with the position of the light application section as the center position of point symmetry.

The photoelectric encoder may further include: a circuit configured to generate a two-phase square wave signal based on the incremental signal and configured to detect an edge of the two-phase square wave signal; a pulse interval detection circuit provided in the origin signal processing section configured to detect the origin detection signal and the edge interval of the two-phase square wave signal; and a changing circuit, provided in the origin signal processing section, configured to change the count start position of the internal period counter from the origin detection signal and the edge interval of the two-phase square wave signal.

The photoelectric encoder may further include: a storing circuit, provided in the origin signal processing section, configured to store the signal level of the differential signal; and a determining circuit, provided in the origin signal processing section, configured to make a comparison between the stored signal level of the differential signal and a newly obtained signal level of the differential signal and configured to determine the presence or absence of occurrence of the origin detection signal.

The light application section may be a diffusion light source, and a width of the origin mark may be nearly half of an opening width of the origin signal light reception section. The half of the opening width of the origin signal light reception section need not strictness and may be slightly differ.

The light application section may be a light source having a point light source or a spatial filter.

According to the invention, image forming means for detecting the origin is not required for the detector, so that the detector can also be miniaturized without being complicated.

The maximum value of the signal levels output from the origin signal light reception sections by side lobe light (of diffraction of light) occurring as reflected on the origin mark is provided as the stipulated value and the effective area of origin detection is determined under the condition that the output from either origin signal light reception section is larger than the stipulated value. The origin detection signal is generated in the effective area. Thus, erroneous detection of the origin because of diffraction of light on the origin mark is circumvented and the precise origin can be detected.

That is, the invention does not require a complicated optical system and can be realized by adding a small-scale electric circuit without adding a new detector or sensor, so that while the photoelectric encoder is compact and low cost, precise origin detection is made possible.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 8 is a drawing to show a flow of origin detection;

FIGS. 12A to 12D are drawings to show an outline of a flow of origin detection when the detector is inclined because of attachment.

DETAILED DESCRIPTION OF THE INVENTION

Figure 1:
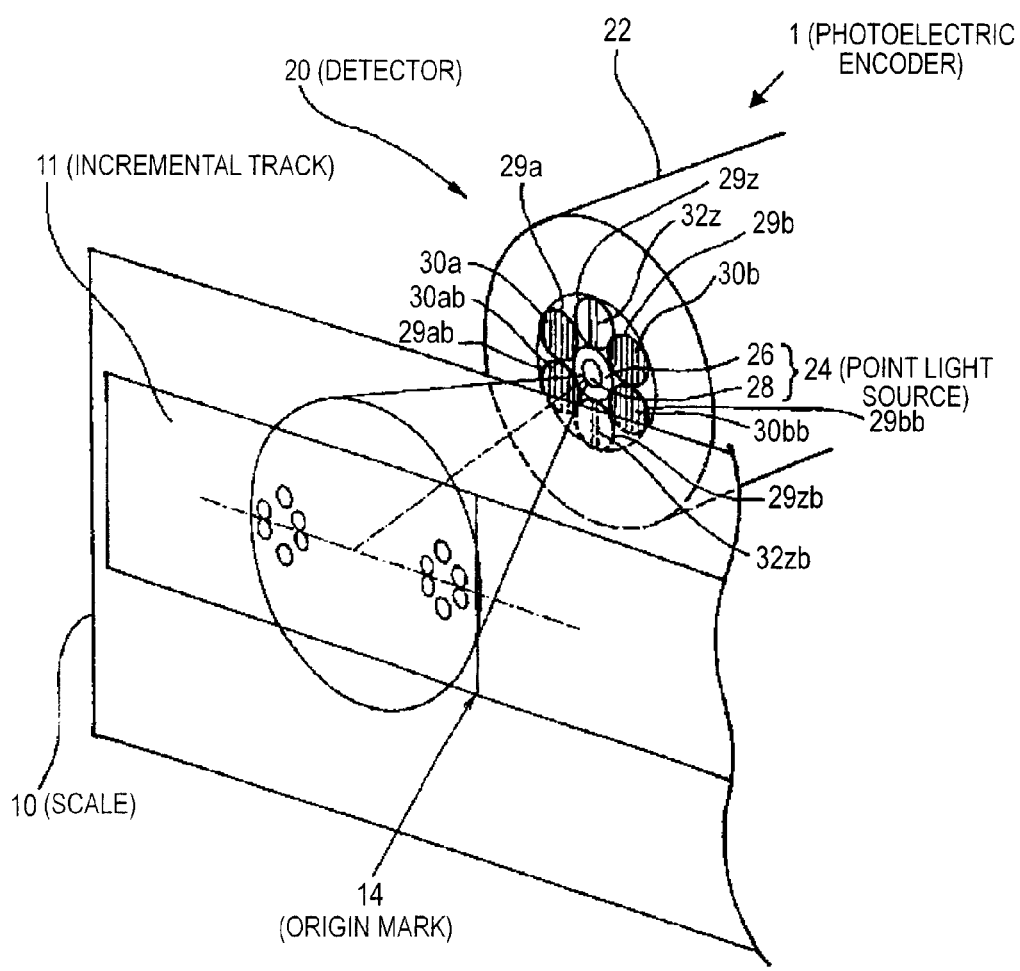
FIG. 1 is a perspective view to shown an outline of an example of a photoelectric encoder according to an embodiment of the invention.
Figure 6:
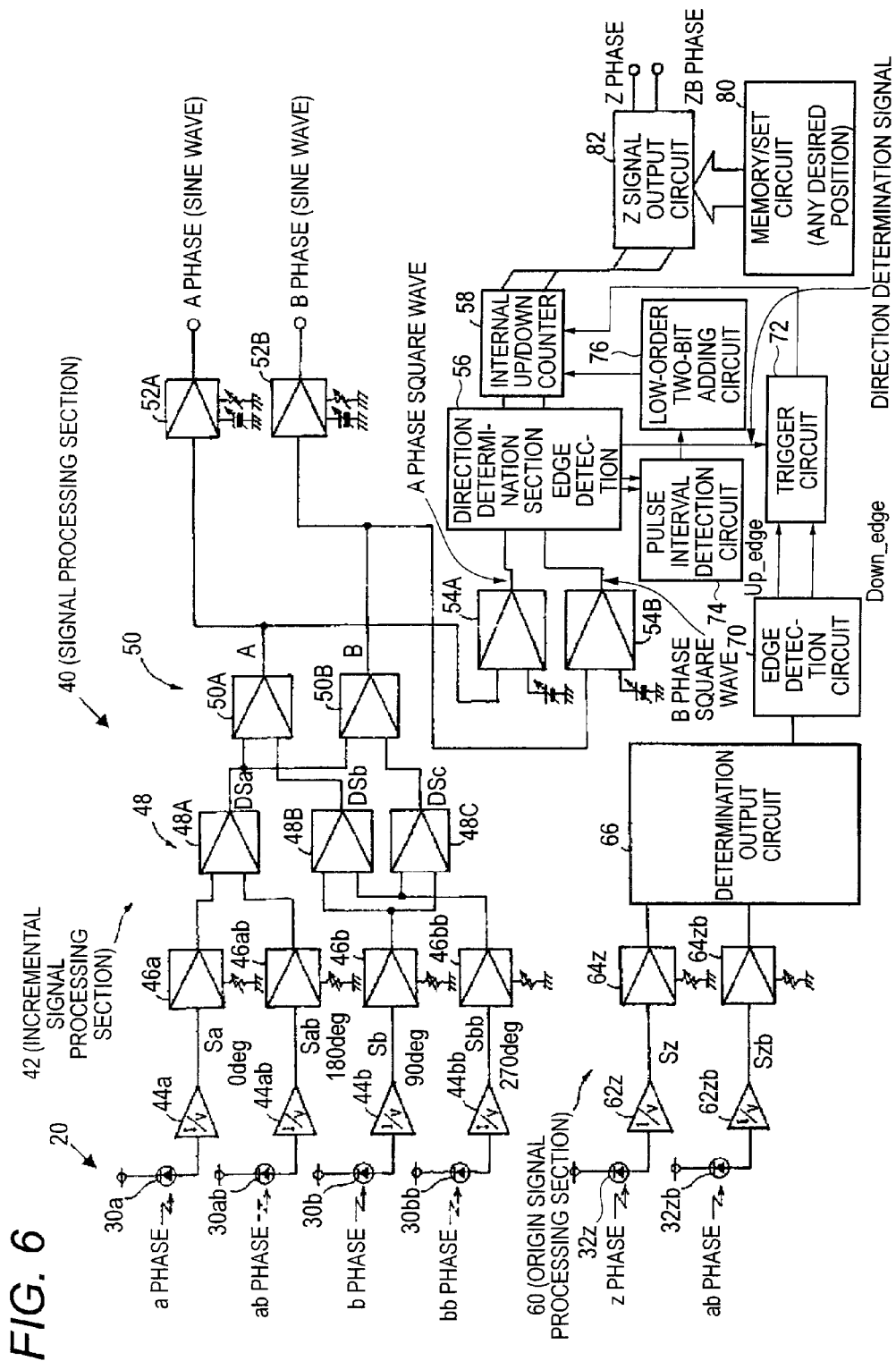
FIG. 6 is a block diagram to show the configuration of a signal processing section connected to the detector.

One embodiment of the invention will be discussed below in detail with reference to the accompanying drawings:

First, the configuration of a photoelectric encoder according to the embodiment of the invention will be discussed below with FIG. 1:

As shown in FIG. 1, a photoelectric encoder 1 of the embodiment includes a scale 10 and a detector 20 which displaces relative to the scale 10. A signal processing section 40 shown in FIG. 6 is connected to the detector 20.

Figure 3:
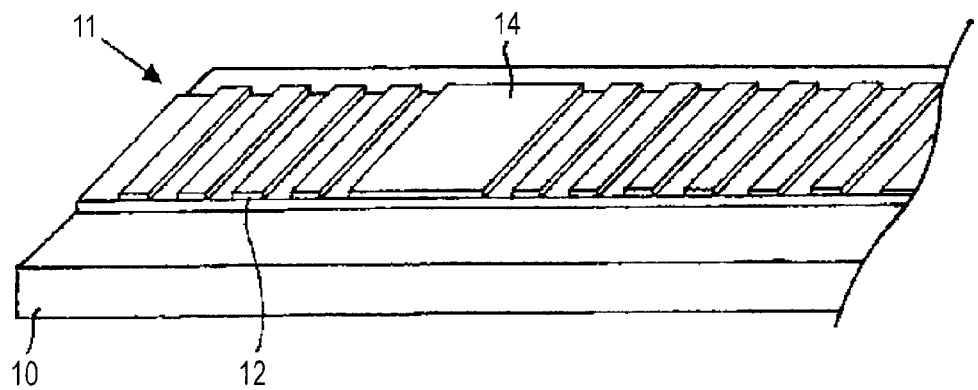
FIG. 3 is a perspective view of a scale.
Figure 4A:
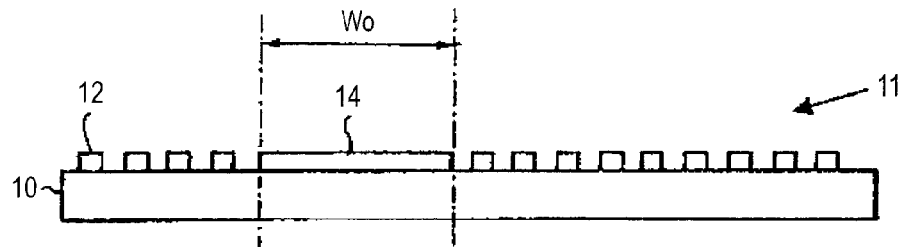
FIGS. 4A and 4B are sectional views to show an example of the scale.
Figure 4B:
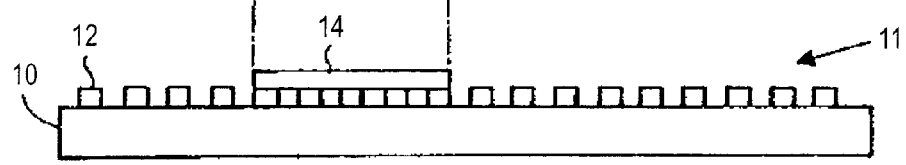

The scale 10 has an incremental track 11 as shown in detail in FIG. 3. The incremental track 11 is formed with reflection phase gratings (reflection gratings) 12 at equal intervals along a length measurement direction. A reflection origin mark 14 is formed in parallel with the reflection gratings 12 in an end part of the incremental track 11 that can be detected by the detector 20 outside the length measurement range of the increment track 11. The origin mark 14 can adopt a grating integral structure as shown in FIG. 4A or an add-on structure as shown in FIG. 4B, for example. The position of the origin mark 14 is not limited to one end part of the scale 10 and two or more origin marks can be provided at any desired positions.

For example, the detector 20 is formed with an optical fiber cable 22, for example, as shown in FIG. 1. The optical fiber cable 22 includes a light emission optical fiber 26 at the center and six light reception optical fibers 29a, 29b, 29ab, 29bb, 29z, and 29zb in the surrounding. That is, the light reception optical fibers 29a, 29b, 29ab, 29bb, 29z, and 29zb are at an equal distance from the light emission optical fiber 26.

As shown in FIG. 1, in the light emission optical fiber 26, a point light source 24 is made up of a spatial filter 28 disposed on an end surface and a laser light source (not shown) disposed on an opposite end surface. That is, in the embodiment, the point light source 24 becomes a light application section, functions as a diffusion light source, and applies light to the incremental track 11. The light application section may be a point light source having no spatial filter, may be simply a diffusion light source rather than the point light source, or may not be a diffusion light source.

Figure 5:
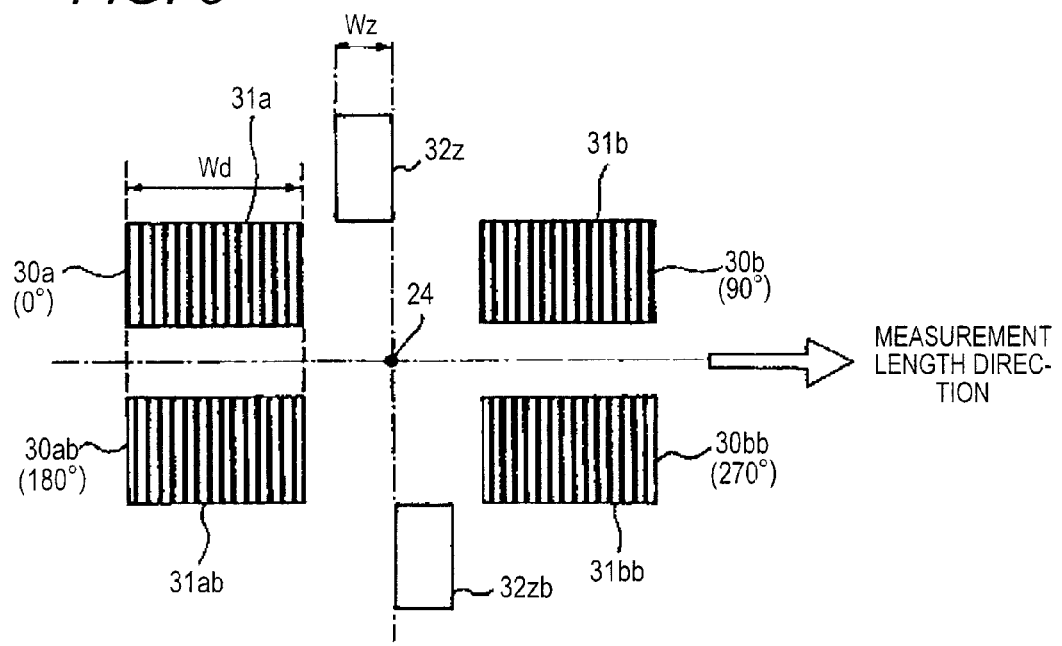
FIG. 5 is a plan view to show light reception placement of a detector.

Index patterns 31a, 31b, 31ab, and 31bb placed in the surrounding of the point light source 24 with the position of the point light source 24 as the center and having relationship of 90-degree phase difference (a phase of phase 0° and b phase of phase 90° and ab phase of phase 180° and bb phase of phase 270°) placed along the length measurement direction and 180-degree phase difference (a phase of phase 0° and ab phase of phase 180° and b phase of phase 90° and bb phase of phase 270°) placed along the perpendicular direction to the length measurement direction are disposed as light reception windows on the end surfaces of the light reception optical fibers 29a, 29b, 29ab, and 29bb of the optical fiber cable 22 (the same end surface side as the light emission optical fiber 26 where the spatial filter 28 is disposed) as shown in detail in FIG. 5. That is, the index patterns 31a, 31b, 31ab, and 31bb are disposed as a cross shape. Thus, the light reception optical fibers 29a, 29b, 29ab, and 29bb receive an interference fringe formed as light applied from the point light source 24 is diffracted in the reflection gratings of the scale 10 through the four light reception windows. A photodetector (not shown) is placed on opposite end surfaces of the light reception optical fibers 29a, 29b, 29ab, and 29bb where the index patterns 31a, 31b, 31ab, and 31bb are not provided, whereby main light reception sections 30a, 30b, 30ab, and 30bb are formed. Thus, the main light reception sections 30a, 30b, 30ab, and 30bb can output four incremental signals different in phase.

Figure 2:
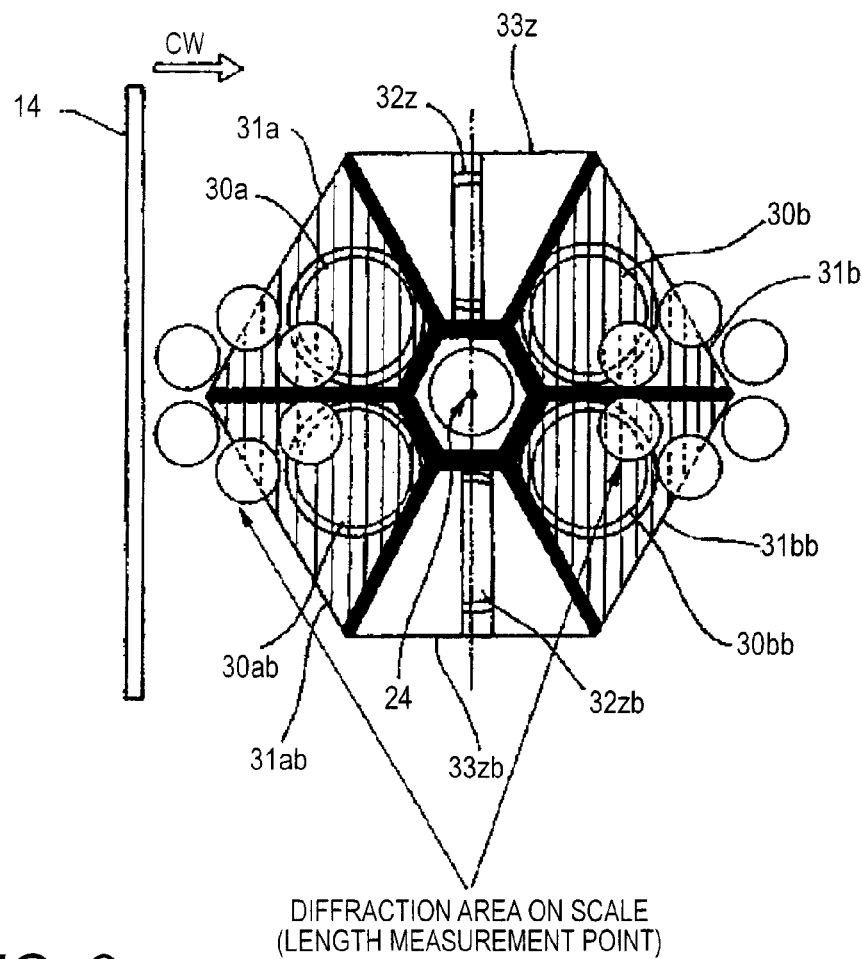
FIG. 2 is a plan view.

As shown in FIG. 2, light reception differential slits 33z and 33zb are disposed in the perpendicular direction to the length measurement direction with the position of the point light source 24 as the center position of point symmetry, namely, in the length direction of the origin mark 14 on the end surfaces of the light reception optical fibers 29z and 29zb of the optical fiber cable 22 (the same end surface side as the light emission optical fiber 26 where the spatial filter 28 is disposed). Further, the light reception differential slits 33z and 33zb are placed symmetrically with respect to the point light source 24 in the length measurement direction. A photodetector (not shown) is placed on opposite end surfaces of the light reception optical fibers 29z and 29zb where the light reception differential slits 33z and 33zb are not provided, whereby a pair of origin signal light reception sections 32z (z phase) and 32zb (zb phase) is formed. The origin signal light reception sections 32z and 32zb are placed on the outside so as to sandwich the main light reception sections 30a, 30b, 30ab, and 30bb in the perpendicular direction to the length measurement direction. Thus, if the detector 20 is attached with rotation with the point light source 24 as the center, the amounts of light received in the origin signal light reception sections 32z and 32zb can be made equal and a position shift of the origin detection position can be minimized (for example, FIG. 12A).

Thus, image forming means for detecting the origin is not required for the detector 20, so that the detector 20 can also be miniaturized without being complicated.

Here, let the length measurement direction width of the main light reception section 30a, 30b, 30ab, 30bb for outputting the incremental signal occurring in the reflection gratings 12 be Wd and the opening width of the origin signal light reception section 32z, 32zb (the width of the light reception differential slit 33z, 33zb) be Wz. Then, in the embodiment, width W0 of the origin mark 14 satisfies conditions in the following expressions (1) and (2):

$$(1/4)Wd > W0 \quad (1)$$

Figure 7:
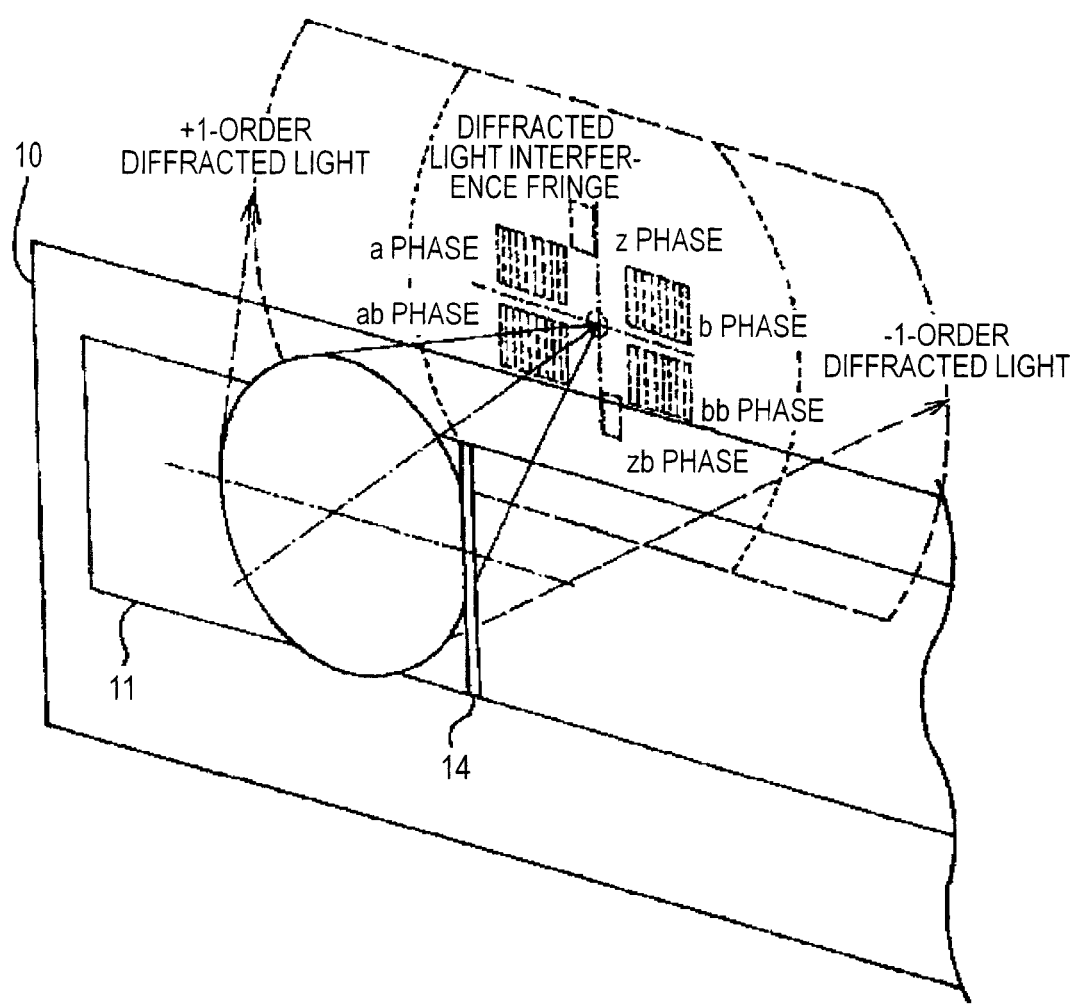
FIG. 7 is a perspective view to show the scale and the detector.

The point light source 24 (diffusion light source) applies light to the origin mark 14 and the distances of the point light source 24 and the index patterns 31a, 31b, 31ab, and 31bb from the origin mark 14 are the same, as shown in FIGS. 1 and 7 (b). That is, in the embodiment, the width of reflected light of the origin mark 14 becomes almost twice the width W0 on the index pattern 31a, 31b, 31ab, 31bb. However, since expression (1) is satisfied, even when the detector 20 passes through the area of the reflected light of the origin mark 14, at least (½) Wd can be ensured as the length measurement direction width of the main light reception section 30a, 30b, 30ab, 30bb for the incremental signal. That is, expression (1) is satisfied, so that a stable incremental signal can be obtained without causing an error to occur from the main light reception sections 30a, 30b, 30ab, and 30bb.

$$(1/2)Wz \text{ is nearly equal to } W0 \quad (2)$$

As described above, in the embodiment, the width of the reflected light of the origin mark 14 on the light reception differential slit 33z, 33zb becomes almost twice the width W0 of the origin mark 14. That is, expression (2) is satisfied, so that the width of the reflected light of the origin mark 14 becomes almost equal to the opening width Wz of the origin signal light reception section 32z, 32zb. That is, when the detector 20 passes through the area of the reflected light of the origin mark 14, the amount of light received in the origin signal light reception section 32z, 32zb can be changed at the maximum. Thus, alignment adjustment is facilitated. If the height of the detector 20 relative to the scale 10 changes, the amounts of light received in the origin signal light reception sections 32z and 32zb are almost the same and thus it is possible to comparatively widen the allowable range if the detector 20 to the scale 10.

The width of the reflected light on the origin mark 14 receives the effect of diffraction of light as described later. Thus, in the embodiment, strictness is not required for the width of the reflected light on the origin mark 14. It is desirable that the width W0 of the origin mark 14 should be sufficiently larger than a period of the reflection grating (for example, five to 10 times).

The signal processing section 40 has an incremental signal processing section 42, a direction determination section 56, an internal up/down counter (internal period counter) 58, and an origin signal processing section 60 as shown in FIG. 6. The incremental signal processing section 42 processes incremental signals output by the main light reception sections 30a, 30b, 30ab, and 30bb by lateral differential vector synthesis. The direction determination section 56 detects edges of an A phase square wave signal and a B phase square wave signal (two-phase square wave signal) described later and determines the direction of the detector 20 displacing relative to the scale 10. The internal period counter 58 counts the number of periods based on the reflection grating 12 occurring because of the relative displacing. The origin signal processing section 60 finds a differential Z signal (differential signal) of output from a pair of the origin signal light reception sections 32z and 32zb based on light reflected on the origin mark 14 and generates an origin detection signal corresponding to the position of the origin mark 14, thereby outputting an origin signal. The components will be discussed below:

The incremental signal processing section 42 has current-voltage converters 44a, 44ab, 44b, and 44bb, amplifiers 46a, 46ab, 46b, and 46bb, a three-phase signal generation section 48, a two-phase sine wave signal generation section 50, gain adjustment sections 52A and 52B, and comparators 54A and 54B, as shown in FIG. 6.

The current-voltage converters 44a, 44ab, 44b, and 44bb are connected to the main light reception sections 30a, 30b, 30ab, and 30bb of the detector 20 respectively. Incremental signals (output) from the main light reception sections 30a, 30b, 30ab, and 30bb are converted into voltage signals (period signals Sa, Sab, Sb, and Sbb). The current-voltage converters 44a, 44ab, 44b, and 44bb are connected to a three-phase signal generation section 48 made up of three differential amplifiers 48A, 48B, and 48C through the amplifiers 46a, 46ab, 46b, and 46bb. That is, the three-phase signal generation section 48 generates three differential signals Dsa, Dsb, and Dsc from the period signals Sa, Sab, Sb, and Sbb. The three-phase signal generation section 48 is connected to the two-phase sine wave signal generation section 50 made up of two vector synthesis differential amplifiers 50A and 50B. That is, the three differential signals Dsa, Dsb, and Dsc are synthesized to two vector signals A and B. The two-phase sine wave signal generation section 50 is connected to the gain adjustment sections 52A and 52B and the two vector signals A and B are output as an A phase sine wave signal and a B phase sine wave signal respectively.

On the other hand, the two-phase sine wave signal generation section 50 is connected to the comparators 54A and 54B and the two vector signals A and B are output as an A phase square wave signal and a B phase square wave signal (two-phase square wave signal) respectively. Thus, it can also be said that the incremental signal processing section 42 is a circuit for generating a two-phase square wave signal based on the incremental signals of the main light reception sections 30a, 30b, 30ab, and 30bb.

The origin signal processing section 60 has current-voltage converters 62z and 62zb, amplifiers 64z and 64zb, a determination output circuit 66, an edge detection circuit 70, a trigger circuit 72, a pulse interval detection circuit 74, a low-order two-bit adding circuit 76, a memory/set circuit 80, and a Z signal output circuit 82.

The current-voltage converters 62z and 62zb are connected to the origin signal light reception sections 32z and 32zb of the detector 20 respectively. Outputs from the origin signal light reception sections 32z and 32zb are converted into voltage signals Sz and Szb. The current-voltage converters 62z and 62zb are connected to the determination output circuit 66 through the amplifiers 64z and 64zb.

The determination output circuit 66 has storage, a differential amplifier, a logical circuit, and a comparator (not shown), for example. The storage stores outputs of the amplifiers 64z and 64zb. The differential amplifier differentially amplifies the outputs and generates a zero-crossing differential Z signal. The logical circuit compares the outputs of the amplifiers 64z and 64zb and the signal level stored in the storage and the signal level of the differential Z signal, and determines an effective area of origin detection. The comparator generates a threshold value in the determination range of the effective area and outputs the differential Z signal as a square wave according to the threshold value.

The edge detection circuit 70 detects an edge of the square wave output from the determination output circuit 66. The trigger circuit 72 generates an origin detection signal of a trigger signal to start counting of the internal period counter 58. That is, the origin detection signal can reset the internal period counter 58.

Thus, the effective area of origin detection is provided by the determination output circuit 66, the edge detection circuit 70, and the trigger circuit 72, and the origin detection signal can be generated in the effective area.

The trigger circuit 72 is also connected to the pulse interval detection circuit 74. The pulse interval detection circuit 74 detects the origin detection signal based on the trigger circuit 72 and the edge interval of the two-phase square wave signal based on the direction determination section 56. The low-order two-bit adding circuit 76 is connected to the pulse interval detection circuit 74 and adds low-order two bits to the internal period counter 58 from the origin detection signal and the edge interval of the two-phase square wave signal. That is, the low-order two-bit adding circuit 76 can change the count start position of the internal period counter 58 from the origin detection signal and the edge interval of the two-phase square wave signal.

The memory/set circuit 80 stores the position of the origin signal relative to the occurrence position of the origin detection signal as the position of the origin signal is specified as desired from the outside. The Z signal output circuit 82 (output circuit) outputs the origin signal in a state in which the count position output from the internal period counter 58 is the position specified in the memory/set circuit 80.

Next, an outline of the operation of the incremental signal processing section 42 shown in FIG. 6 will be discussed.

Light applied from the point light source 24 is diffracted in the reflection gratings 12 of the incremental track 11 and an interference fringe is formed on the detector 20, as shown in FIG. 7. The interference fringe is received in the main light reception sections 30a, 30b, 30ab, and 30bb having the four index patterns 31a, 31b, 31ab, and 31bb different in phase. The incremental signals are output from the main light reception sections 30a, 30b, 30ab, and 30bb. Based on the incremental signals, the A phase sine wave signal and the B phase sine wave signal are output from the incremental signal processing section 42 through the current-voltage converters 44a, 44ab, 44b, and 44bb, the amplifiers 46a, 46ab, 46b, and 46bb, the three-phase signal generation section 48, the two-phase sine wave signal generation section 50, and the gain adjustment sections 52A and 52B.

Next, the operation of the origin signal processing section 60 will be discussed with reference to FIGS. 8 to 12D.

As shown in a section (a) of FIG. 8, as a relative move of the origin mark (in the figure, CW direction) is made, first the light reception amounts in the main light reception sections 30a (a phase) and 30ab (ab phase) fluctuate upon reception of the effect of reflection of the origin mark 14. Accordingly, the signal levels of the period signals Sa and Sab also fluctuate (P1 portion in a section (b) of FIG. 8). However, if the light reception amounts fluctuate, a count error does not occur in the vector signal A or B output from the two-phase sine wave signal generation section 50 as previously described. This phenomenon also applies to P3, P5, and P7 portions in the section (b) of FIG. 8.

Next, the signal level of the voltage signal Sz (Szb) based on the output from the origin signal light reception sections 32z (32zb) placed between the main light reception sections 30a (30ab) and 30b (30bb) fluctuates because of temporary lowering of the diffracted light amount (P2 portion in a section (d) of FIG. 8). This phenomenon also applies to a P6 portion in the section (d) of FIG. 8.

Next, when the origin mark 14 comes to a position opposed to the origin signal light reception sections 32z and 32zb, the amounts of reflected light by the origin mark 14 directly received in the origin signal light reception sections 32z and 32zb increase. Accordingly, the signal levels of the voltage signals Sz and Szb based on the output of the origin signal light reception sections 32z and 32zb increase, take the maximum values, and decrease (P4 portion in the section (d) of FIG. 8). A differential Z signal is obtained from the voltage signals Sz and Szb.

Next, an origin detection signal is generated on the falling edge of the differential Z signal and the internal period counter 58 is reset (as shown in a section (e2) of FIG. 8). As shown in the section (d) of FIG. 8, fluctuations before and after the position of the origin mark 14 opposed to the origin signal light reception sections 32z and 32zb (P2 and P6 portions) and fluctuation at the opposed position (P4 portion) differ in edge direction of the differential Z signal (the former is the rising edge and the latter is the falling edge). Thus, origin detection corresponding to the position of the origin mark 14 is made possible.

Figure 9A:
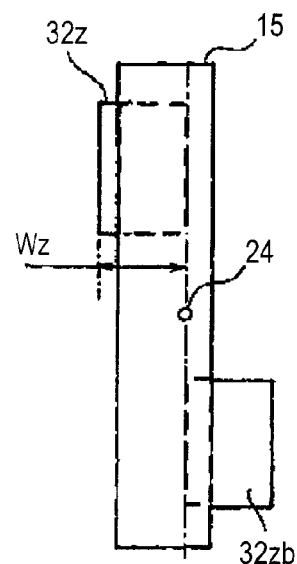
FIGS. 9A and 9B are schematic drawings to show the relationship between an origin mark and the detector.
Figure 9B:
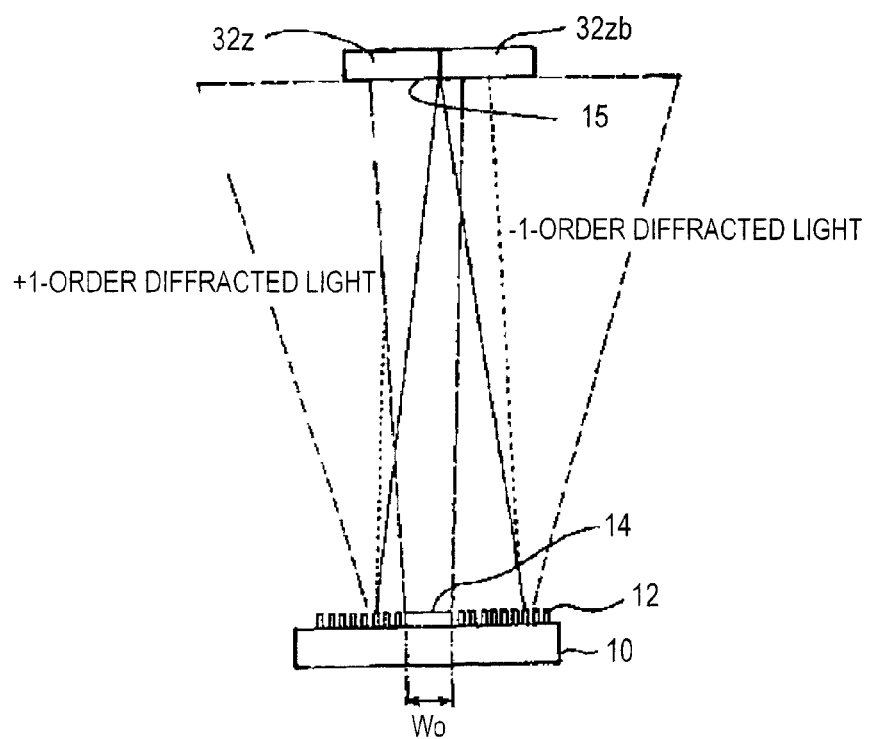
Figure 10:
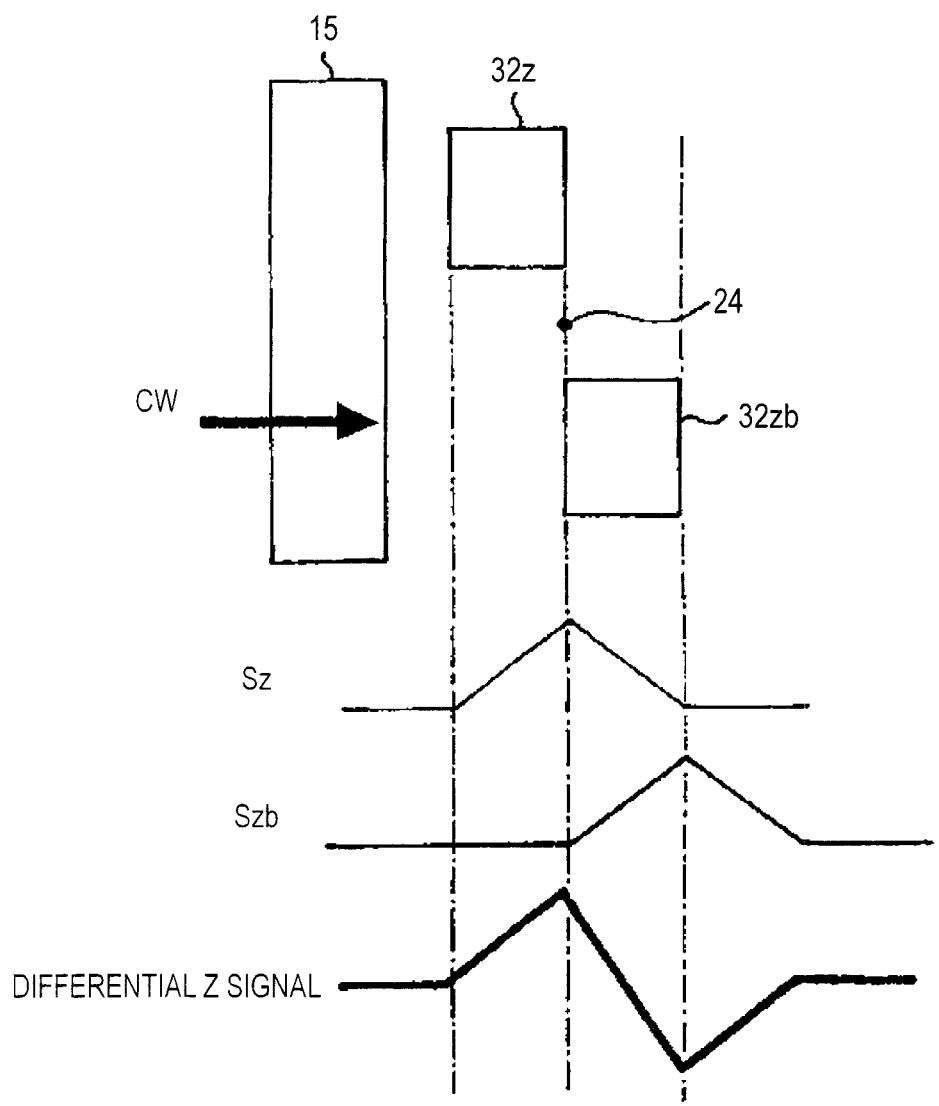
FIG. 10 is a schematic drawing to show an outline of origin detection.

How the origin signal light reception sections 32z and 32zb directly receive the reflected light by the origin mark 14 (corresponding to P4 portion) will be discussed below in detail:

First, the placement at the time is shown in FIGS. 9A and 9B. Reference numeral 15 denotes reflected light on the origin signal light reception sections 32z and 32zb by the origin mark 14 and the width of the reflected light is almost the same as the opening width Wz of the origin signal light reception section 32z, 32zb. When the origin signal light reception section 32z, 32zb detects the origin mark 14 (when the reflected light 15 is directly incident), schematically, voltage signals Sz and Szb and differential Z signal as shown in FIG. 10 are output. The positional relationship shown in FIG. 10 is easy-to-understand placement of the relationship among the opening width Wz of the origin signal light reception section 32z, 32zb, the width of the reflected light 15 by the origin mark 14, and the width of each signal and does not necessarily indicate the actual positional relationship. The voltage signals Sz and Szb based on the output of the origin signal light reception sections 32z and 32zb contain a DC component of a diffracted light interference component from other than the origin mark 14. FIG. 10 show schematic signals and thus more detailed signals are shown in FIGS. 11A to 11F and will be discussed.

Figure 11A:
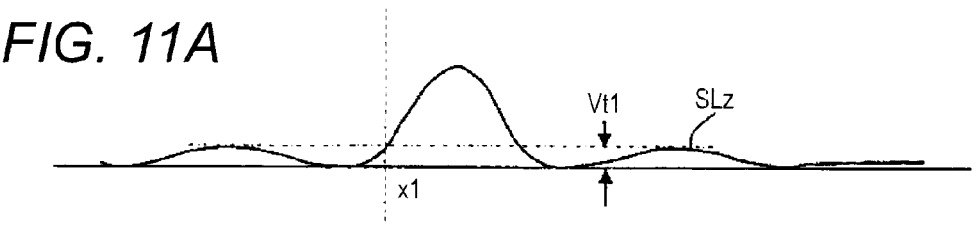
FIGS. 11A to 11F are schematic drawings to show details of origin detection.
Figure 11B:
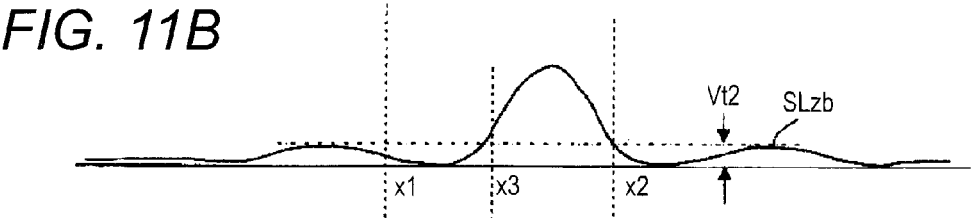

In the embodiment, when light is applied to the origin mark 14, diffraction of light occurs. Thus, at the position of regular reflection of the origin mark 14, the origin signal light reception sections 32z and 32zb can observe the maximum light amount; side lobe light caused by diffraction of light exists on the outside of the position of regular reflection. That is, as shown in FIGS. 11A and 11B, the voltage signals Sz and Szb based on the output of the origin signal light reception sections 32z and 32zb also include side lobe signals SLz and SLzb because of the side lobe light. Thus, when the differential Z signal of the voltage signals Sz and Szb is found, a plurality of zero cross points occur because of the effect of the side lobe signals SLz and SLzb.

Thus, in the determination output circuit 66, the maximum values of the signal levels of the voltage signals Sz and Szb output from the origin signal light reception sections 32z and 32zb by side lobe light occurring as reflected on the origin mark 14 (maximum values Vt1 and Vt2 of the side lobe signals SLz and SLzb) are stored in the storage and the maximum value is provided as a stipulated value Vt (Vt1=Vt2 because the opening widths Wz of the origin signal light reception sections 32z and 32zb are the same).

In the origin signal light reception section 32z outputting the signal level of the voltage signal Sz larger than the stipulated value Vt early because of relative displacement of the detector 20 to the scale, a first position x1 where the output voltage signal Sz becomes a signal level larger than the stipulated value Vt is found (FIG. 11A). In the origin signal light reception section 32zb, a first position x2 where the output voltage signal Szb exceeds the stipulated value Vt and then becomes a signal level smaller than the stipulated value Vt is found (FIG. 11B). An effective area of origin detection is provided between the positions x1 and x2 as shown in FIG. 11D.

Figure 11C:
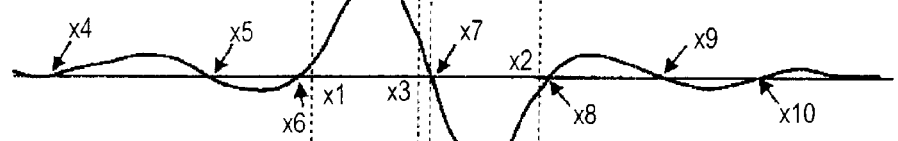
Figure 11D:
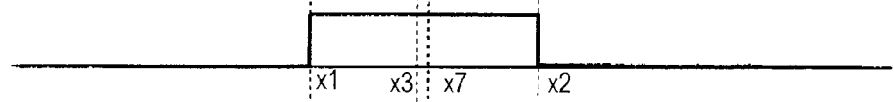
Figure 11E:
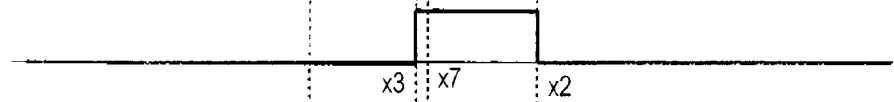

On the other hand, the period signals Sz and Szb based on the output of the origin signal light reception sections 32z and 32zb are differentially amplified and a differential Z signal shown in FIG. 11C is obtained. The effective area of origin detection is limited between positions x3 and x2 in the range in which the voltage signal Szb based on output of the origin signal light reception section 32zb becomes larger than the signal level of the differential Z signal (FIG. 11 E).

The differential Z signal is output as a square wave in the comparator between the positions x3 and x2 of the limited effective area of origin detection. That is, of zero cross positions x4 to x10 of the differential signal in FIG. 11C, the zero cross point is determined at the position x7 between the positions x3 and x2. The described operation is performed by the determination output circuit 66.

Figure 11F:
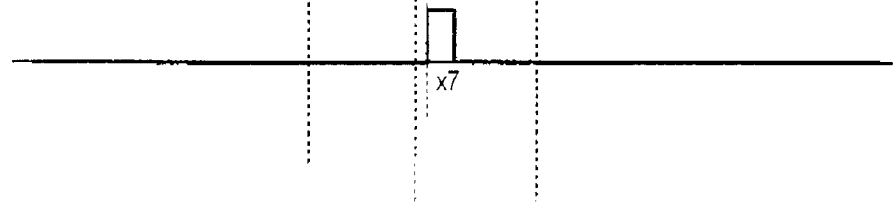

The edge detection circuit 70 and the trigger circuit 72 generate an origin detection signal shown FIG. 11F.

Thus, the maximum value of the signal levels of the period signals Sz and Szb output from the origin signal light reception sections 32z and 32zb by side lobe light (of diffraction of light) occurring as reflected on the origin mark 14 is provided as the stipulated value Vt and the effective area of origin detection is determined under the condition that the output from either the origin signal light reception section 32z or 32zb is larger than the stipulated value Vt. The origin detection signal is generated in the effective area. Since the stipulated value Vt changes in association with fluctuation of the amounts of light received in the origin signal light reception sections 32z and 32zb, the effective area of robust origin detection for fluctuation of the light reception amounts can be determined. Thus, erroneous detection of the origin because of diffraction of light on the origin mark is circumvented and the precise origin can be detected.

The effective area of origin detection is limited between the positions x3 and x2 in the range in which the output of the origin signal light reception section 32zb becomes larger than the signal level of the differential Z signal shown in FIG. 11C, so that erroneous detection of the origin is further reliably circumvented and origin detection can be performed rapidly.

The description is given below from a section (e1) and the section (e2) of FIG. 8:

Next, the internal period counter 58 is reset by the origin detection signal and period count is started. An origin signal is output in synchronization with the period count from the Z signal output circuit 82 at any desired position set by the memory/set circuit 80 (a position where light reception amount fluctuation of the main light reception section 30a, 30ab, 30b, 30bb sufficiently after an edge pulse does not occur is desirable). Accordingly, it is made possible to output the origin signal at any desired position.

If dust exists on the scale 10, the increasing and decreasing directions of the differential Z phase signal become opposite and thus the move direction is determined by the function of the direction determination section 56 and the presence or absence of dust can be easily determined.

In the embodiment, further the pulse interval detection circuit 74 for detecting the origin detection signal and the edge interval of the two-phase square wave signal and the low-order two-bit adding circuit 76 for adding low-order two bits to the internal period counter 58 from the origin detection signal and the edge interval of the two-phase square wave signal are included. That is, the low-order two-bit adding circuit 76 can change the count start position of the internal period counter 58. Thus, period skip that can occur because of fluctuation of the reset position by the origin detection signal can be prevented and reproducibility of the origin signal can be ensured. This topic will be specifically discussed with FIGS. 12A to 12D.

As shown in FIG. 12A, if the detector is inclined relative to the scale 10 by attachment, when repeated measurement is performed (in the figure, circled digits 1, 2, and 3), two bits are added to the low order of a counter (quarter period counter) and a half period can be shifted. Thus, the internal period counter 58 can start period count on a down edge of the two-phase square wave signal (in the figure, two-phase square wave) and repeated reproducibility of the origin signal can be improved (FIG. 12D). Theoretically, if reproducibility <±½ period, reproducibility of the origin signal (any desired position) can be ensured. That is, skip of period count as shown in FIG. 12C is prevented and compensating for degradation of reproducibility of origin detection because of attachment is conducted, so that repeated reproducibility of the origin signal can be improved. FIG. 12B shows the case where the detector 20 is not inclined.

The determination output circuit 66 has a circuit for storing the signal level of the differential Z signal and a circuit for making a comparison between the stored signal level of the differential Z signal and the signal level of a new obtained differential Z signal, thereby determining the presence or absence of occurrence of an origin detection signal, so that the origin can also be detected with higher accuracy regardless of change in the reflectivity caused by degradation of the light source or dirt/oxidation of a surface.

That is, the embodiment does not require a complicated optical system and can be realized by adding a small-scale electric circuit without adding a new detector or sensor, so that while the photoelectric encoder 1 is compact and low cost, precise origin detection is made possible.

The invention has been described with the embodiment, but is not limited to the embodiment. That is, improvement and design change are possible without departing from the spirit and the scope of the invention, needless to say.

In the embodiment, the effective area of origin detection is placed in the range in which the period signal Szb based on the output of the origin signal light reception section 32zb becomes larger than the signal level of the differential Z signal, and double limitation is placed, but the invention is not limited to it. For example, it is not necessary to further place the limitation and if double limitation is placed, the percentage to the maximum amount of light received in the origin signal reception section (for example, a half, etc.,) or the like may be determined and used from an experiment.

In the embodiment, the signal processing section 40 includes the internal period counter 58 which is reset by the origin detection signal and counts the number of periods by the reflection gratings 12 occurring in relative displacement of the detector 20 to the scale 10, and the origin signal processing section 60 includes the memory/set circuit 80 for storing the position of the origin signal relative to the occurrence position of the origin detection signal as the position of the origin signal is specified from the outside and the output circuit (Z signal output circuit 82) for outputting the origin signal in a state in which the count position output from the internal period counter 58 is the position specified in the memory/set circuit 80, but the invention is not limited to the mode. For example, they are not included and the origin signal may be output at the stage at which the origin detection signal occurs.

In the embodiment, the detector 20 includes the main light reception sections 30a, 30b, 30ab, and 30bb for receiving an interference fringe formed as light applied from the light application section is diffracted in the reflection gratings 12 of the scale 10 through the four light reception windows (index patterns 31a, 31b, 31ab, and 31bb) placed in the surrounding of the light application section (point light source 24) with the light application section as the center and having relationship of 90-degree phase difference placed along the length measurement direction and 180-degree phase difference placed along the perpendicular direction to the length measurement direction and outputting four incremental signals different in phase, and a pair of origin signal light reception sections 32z and 32zb is further placed in the perpendicular direction to the length measurement section with the position of the light application section as the center position of point symmetry, but the invention is not limited to the configuration and the components are not indispensable.

In the embodiment, further the signal processing section 40 includes the circuit (the incremental signal processing section 42 and the direction determination section 56) for generating a two-phase square wave signal based on an incremental signal and detecting an edge of the two-phase square wave signal, and the origin signal processing section includes the pulse interval detection circuit 74 for detecting the origin detection signal and the edge interval of the two-phase square wave signal and the circuit (the low-order two-bit adding circuit 76) for changing the count start position of the internal period counter 58 from the origin detection signal and the edge interval of the two-phase square wave signal, but the invention is not limited to the configuration and the components are not indispensable.

In the embodiment, the origin signal processing section 60 further has the circuit for storing the signal level of the differential Z signal and the circuit for making a comparison between the stored signal level of the differential Z signal and a newly obtained signal level of the differential Z signal, thereby determining the presence or absence of occurrence of an origin detection signal, but the invention is not limited to the configuration and the components are not indispensable.

In the embodiment, the light application section is a diffusion light source and the width W0 of the origin mark 14 is a half of the opening width Wz of the origin signal light reception section 32z, 32zb, but the invention is not limited to the mode and the mode is not indispensable.

In the embodiment, the detector is formed with an optical fiber, but the invention is not limited to it; for example, the detector can also be formed using a light emitting diode and a photodiode or a photodiode array, etc.

What is claimed is:

1. A photoelectric encoder comprising:
   a scale having an incremental track formed with reflection gratings at equal intervals along a length measurement direction;
   a detector which displaces relative to the scale;
   a reflection origin mark formed in at least one place of the incremental track, provided on the scale;
   alight application section provided in the detector for applying light to the incremental track;
   a pair of origin signal reception sections provided in the detector and placed symmetrically with respect to the light application section in the length measurement direction; and
   a signal processing section having an origin signal processing section configured to find a differential signal of output from the pair of origin signal reception sections by light reflected on the origin mark, configured to generate an origin detection signal corresponding to a position of the origin mark, and configured to output an origin signal, wherein
   the origin signal processing section is adapted to provide the maximum value of the signal level output from the origin signal reception sections by side lobe light occurring as reflected on the origin mark as a stipulated value, provide an effective area of origin detection between the first position at which output of one of the origin signal reception sections for outputting a larger signal level than the stipulated value earlier than the relative displacement becomes a larger signal level than the stipulated value and the first position at which output of the other origin signal reception section exceeds the stipulated value and then becomes a smaller signal level than the stipulated value, and generate the origin detection signal in the effective area.

2. The photoelectric encoder as claimed in claim 1, wherein the effective area is a range in which the output of the other origin signal reception section becomes larger than the signal level of the differential signal.

3. The photoelectric encoder as claimed in claim 1 wherein the signal processing section comprises:
   an internal period counter which is reset by the origin detection signal and counts the number of periods according to the reflection gratings occurring because of the relative displacement;
   a memory/set circuit, provided in the origin signal processing section, configured to store the position of the origin signal relative to the occurrence position of the origin detection signal as the position of the origin signal is specified from the outside; and
   an output circuit, provided in the origin signal processing section, configured to output the origin signal in a state in which the count position output from the internal period counter is the position specified in the memory/set circuit.

4. The photoelectric encoder as claimed in claim 1, wherein:
the detector comprises main light reception sections configured to receive an interference fringe formed as light applied from the light application section is diffracted in the reflection gratings of the scale through four light reception windows placed in the surrounding of the light application section with the position of the light application section as the center and having relationship of 90-degree phase difference placed along the length measurement direction and 180-degree phase difference placed along the perpendicular direction to the length measurement direction and configured to output four incremental signals different in phase; and
the pair of origin signal light reception sections is placed in the perpendicular direction to the length measurement section with the position of the light application section as the center position of point symmetry.

5. The photoelectric encoder as claimed in claim 4, further comprising:
a circuit configured to generate a two-phase square wave signal based on the incremental signal and configured to detect an edge of the two-phase square wave signal;
a pulse interval detection circuit provided in the origin signal processing section configured to detect the origin detection signal and the edge interval of the two-phase square wave signal; and
a changing circuit, provided in the origin signal processing section, configured to change the count start position of the internal period counter from the origin detection signal and the edge interval of the two-phase square wave signal.

6. The photoelectric encoder as claimed in claim 1, further comprising:
a storing circuit, provided in the origin signal processing section, configured to store the signal level of the differential signal; and
a determining circuit, provided in the origin signal processing section, configured to make a comparison between the stored signal level of the differential signal and a newly obtained signal level of the differential signal and configured to determine the presence or absence of occurrence of the origin detection signal.

7. The photoelectric encoder as claimed in claim 1, wherein:
the light application section is a diffusion light source; and
a width of the origin mark is nearly half of an opening width of the origin signal light reception section.

8. The photoelectric encoder as claimed in claim 7, wherein the light application section is a light source having a point light source or a spatial filter.

* * * * *